United States Patent
Saito et al.

(10) Patent No.: US 10,779,522 B2
(45) Date of Patent: Sep. 22, 2020

(54) ROTATION TRANSMISSION MECHANISM AND SPINNING REEL FOR FISHING HAVING THE SAME

(71) Applicant: Shimano Inc., Sakai, Osaka (JP)

(72) Inventors: Kei Saito, Sakai (JP); Takuji Takamatsu, Sakai (JP); Satoshi Ikebukuro, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 176 days.

(21) Appl. No.: 16/115,299

(22) Filed: Aug. 28, 2018

(65) Prior Publication Data

US 2019/0104713 A1     Apr. 11, 2019

(30) Foreign Application Priority Data

Oct. 6, 2017   (JP) ................... 2017-196139

(51) Int. Cl.
*A01K 89/01*          (2006.01)
(52) U.S. Cl.
CPC ............................... *A01K 89/0114* (2013.01)
(58) Field of Classification Search
CPC ........ A01K 89/0114; A01K 89/011223; A01K 89/01916
See application file for complete search history.

(56) References Cited

U.S. PATENT DOCUMENTS

| | | | | |
|---|---|---|---|---|
| 5,249,760 A | * | 10/1993 | Morimoto | A01K 89/01 242/279 |
| 5,996,919 A | * | 12/1999 | Murayama | A01K 89/0193 242/279 |
| 6,460,792 B1 | * | 10/2002 | Morimoto | A01K 89/0114 242/241 |
| 2007/0057105 A1 | * | 3/2007 | Kitajima | A01K 89/0114 242/241 |

FOREIGN PATENT DOCUMENTS

| | | | | |
|---|---|---|---|---|
| JP | 2010-166837 | * | 8/2010 | ......... A01K 89/0114 |
| JP | 2015-128403 A | | 7/2015 | |

* cited by examiner

*Primary Examiner* — Emmanuel M Marcelo
(74) *Attorney, Agent, or Firm* — United IP Conselors, LLC

(57) ABSTRACT

A rotation transmission mechanism of a spinning reel for fishing transmits a rotation of a handle to a driven gear of a reciprocating mechanism. The rotation transmission mechanism includes an intermediate gear, a shaft member, and a biasing member. The intermediate gear rotates in response to rotation of the handle, meshes with the driven gear, and transmits the rotation of the handle to the driven gear. The shaft member rotatably supports the intermediate gear. The biasing member biases the intermediate gear in an axial direction of the shaft member.

11 Claims, 4 Drawing Sheets

ROTATION TRANSMISSION MECHANISM AND SPINNING REEL FOR FISHING HAVING THE SAME

CROSS-REFERENCE TO RELATED APPLICATIONS

This application claims priority to Japanese Patent Application No. 2017-196139, filed Oct. 6, 2017. The contents of that application are herein incorporated by reference in their entirety.

BACKGROUND

Technical Field

The present disclosure relates to a rotation transmission mechanism, particularly to a rotation transmission mechanism of a spinning reel for fishing that transmits a rotation of a handle to a driven gear of a reciprocating mechanism, and a spinning reel for fishing having this rotation transmission mechanism.

Background Information

A spinning reel for fishing has a reciprocating mechanism for evenly winding a fishing line on a spool. The reciprocating mechanism disclosed in Japanese Patent Application Laid-open No. 2015-128403 has a driven gear to which rotation of the handle is transmitted. The rotation of the handle is transmitted to the driven gear via a deceleration mechanism. The deceleration mechanism includes a first gear meshing with a pinion gear, and a second gear rotating integrally with the first gear and meshing with the driven gear. When the rotation of the handle is transmitted to the first gear via the pinion gear, the second gear rotates integrally with the first gear, transmitting the rotation of the handle from the second gear to the driven gear. In this manner, the rotation of the handle is transmitted to the reciprocating mechanism.

According to the reciprocating mechanism described in Japanese Patent Application Laid-open No. 2015-128403 that is provided with the driven gear, when the rotation of the handle is transmitted to the reciprocating mechanism via the deceleration mechanism, wobbling might occur in the gears in the rotation axis direction. Particularly, in the reciprocating mechanism described in Japanese Patent Application Laid-open No. 2015-128403, wobbling is likely to occur when the deceleration mechanism comes into contact with the first gear and a second intermediate gear in the axial direction, the first gear and the second intermediate gear being formed separately. Transmission of these wobbling motions to the reciprocating mechanism causes wobbling not only in the axial direction but also in the rotation direction, eventually affecting the wobbling of the handle shaft.

BRIEF SUMMARY

It is an object of the present disclosure to reduce axial wobbling of gears provided in a rotation transmission mechanism.

A rotation transmission mechanism of a spinning reel for fishing according to one aspect of the present disclosure transmits rotation of a handle to a driven gear of a reciprocating mechanism. The rotation transmission mechanism has an intermediate gear, a shaft that rotatably supports the intermediate gear, and a biasing member that biases the intermediate gear in an axial direction. The intermediate gear is restricted from moving in the axial direction.

In this rotation transmission mechanism, the biasing member can reduce wobbling of the intermediate gear in the axial direction. Thus, axial wobbling of the intermediate gear is not transmitted easily to the reciprocating mechanism. Consequently, not only is it possible to reduce axial wobbling of the intermediate gear, but also wobbling of the intermediate gear in a rotation direction can be inhibited, which can eventually prevent wobbling of a handle shaft.

It is preferred that the intermediate gear include a first intermediate gear, a second intermediate gear, and the shaft. The first intermediate gear rotates in response to the rotation of the handle. The second intermediate gear is coupled to the first intermediate gear so as to be integrally rotatable therewith and meshes with the driven gear. The shaft rotatably supports at least either the first intermediate gear or the second intermediate gear. The biasing member is disposed between the first intermediate gear and the second intermediate gear in the axial direction to bias the first intermediate gear and the second intermediate gear in a direction in which the first intermediate gear and the second intermediate gear axially separate from each other. The first intermediate gear and the second intermediate gear are restricted from moving to separate from each other in the axial direction.

In this case, because the biasing member can reduce wobbling of the first intermediate gear and the second intermediate gear in the axial direction, wobbling of the first intermediate gear and the second intermediate gear in the axial direction is not easily transmitted to the reciprocating mechanism. Consequently, wobbling of the handle shaft can be prevented as well.

It is preferred that the first intermediate gear have a first gear body that has gear teeth on an outer peripheral surface thereof, and a through hole through which the shaft penetrates in the axial direction. The second intermediate gear is supported rotatably by the shaft, and includes a second gear body having a diameter larger than an outer diameter of the through hole of the first intermediate gear and having gear teeth on an outer peripheral surface thereof, and a small-diameter portion that extends from a side surface of the second gear body toward the first intermediate gear in the axial direction and has a diameter smaller than an outer diameter of the second gear body. The biasing member is an elastically deformable, annular elastic member disposed on an outer periphery of the small-diameter portion of the second intermediate gear. In this case, the biasing member can easily be disposed between the first gear body and the second gear body in the axial direction.

It is preferred that the through hole of the first intermediate gear be capable of housing a portion of the second intermediate gear, and that the small-diameter portion of the second intermediate gear partially come in contact with an inner peripheral portion of the through hole to support the first intermediate gear. In this case, the first intermediate gear can be supported by the second intermediate gear.

It is preferred that the small-diameter portion of the second intermediate gear include, on an outer periphery thereof, an engaging portion that is engaged with the first intermediate gear. In this case, the first intermediate gear and the second intermediate gear can be engaged with each other by means of a simple configuration.

It is preferred that at least either the first intermediate gear or the second intermediate gear be a helical gear. In this case, the biasing member can reduce a load applied in the axial direction.

It is preferred that the gear teeth of the first intermediate gear have a shape different from that of the gear teeth of the second intermediate gear.

It is preferred that the biasing member be a coned-disc spring or a curved washer.

A spinning reel for fishing according to one aspect of the present disclosure includes any one of the rotation transmission mechanisms described above.

According to the present disclosure, wobbling of the gears of the rotation transmission mechanism can be reduced in the axial direction.

DETAILED DESCRIPTION

Figure 1:
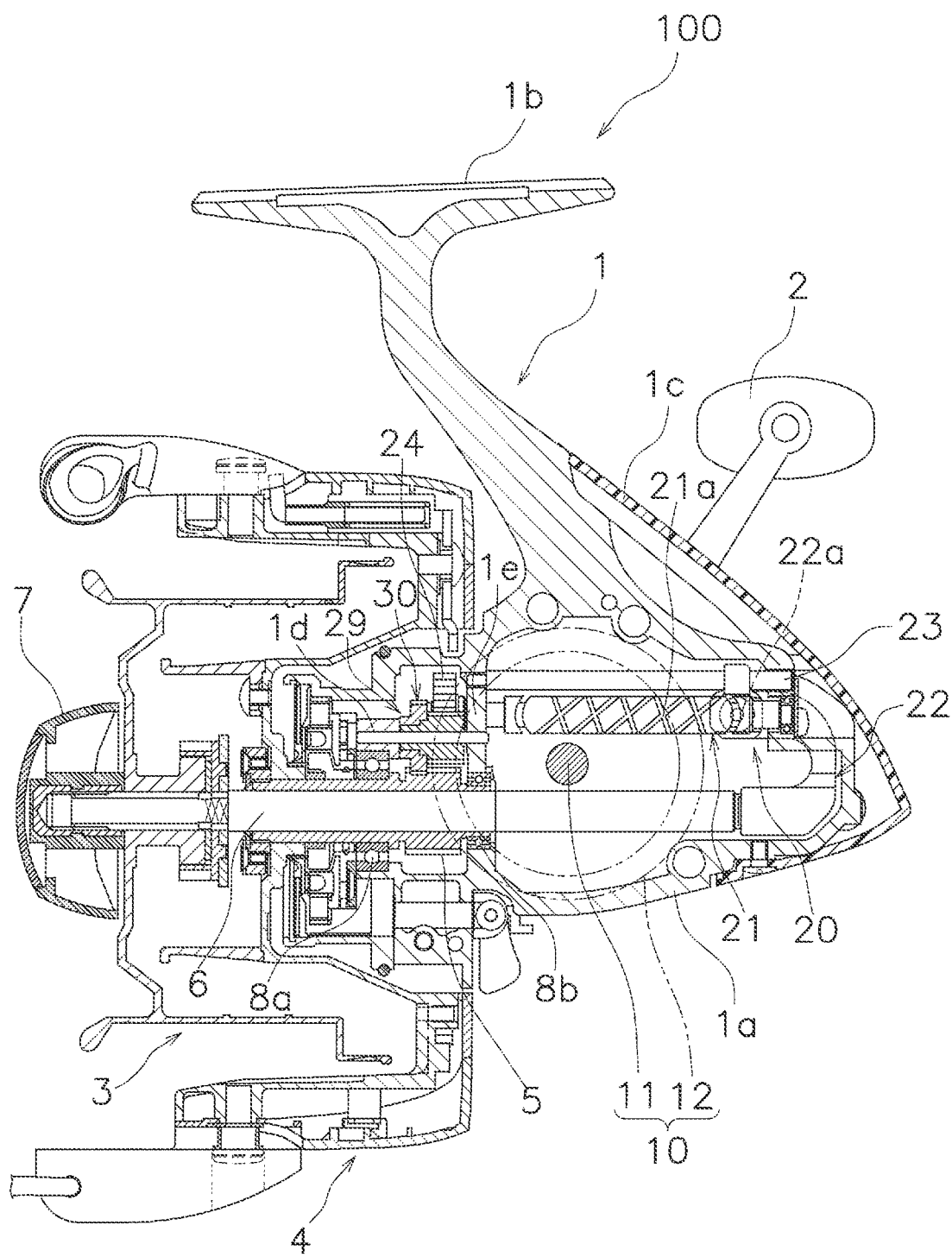
FIG. 1 is a vertical cross-sectional diagram of a spinning reel employing an embodiment of the present disclosure.

In the following descriptions, the term front-rear means that the direction in which a fishing line is pulled out at the time of fishing is referred to as the front and that the direction opposite thereto is referred to as the rear. In addition, the terms left and right refer to the left-hand side and the right-hand side of a spinning reel 100 viewed from behind. Also, the direction in which a spool shaft 6 extends is referred to as an axial direction.

The spinning reel 100 employing an embodiment of the present disclosure includes a reel body 1, a handle 2, a spool 3, a rotor 4, and a pinion gear 5.

The reel body 1 has a casing 1a having one side (the left side, in this case) opened, a rod mounting portion 1b formed integrally with the casing 1a, and a cover 1c covering the rear of the casing 1a. The opened portion of the casing 1a is covered by a lid, not shown, and a rotor drive mechanism 10 that drives the rotor 4, a reciprocating mechanism 20 that evenly winds a fishing line on the spool 3, a rotation transmission mechanism 29 that transmits rotation of the handle 2 to the reciprocating mechanism 20, and the like, are housed in the casing 1a.

Figure 2:
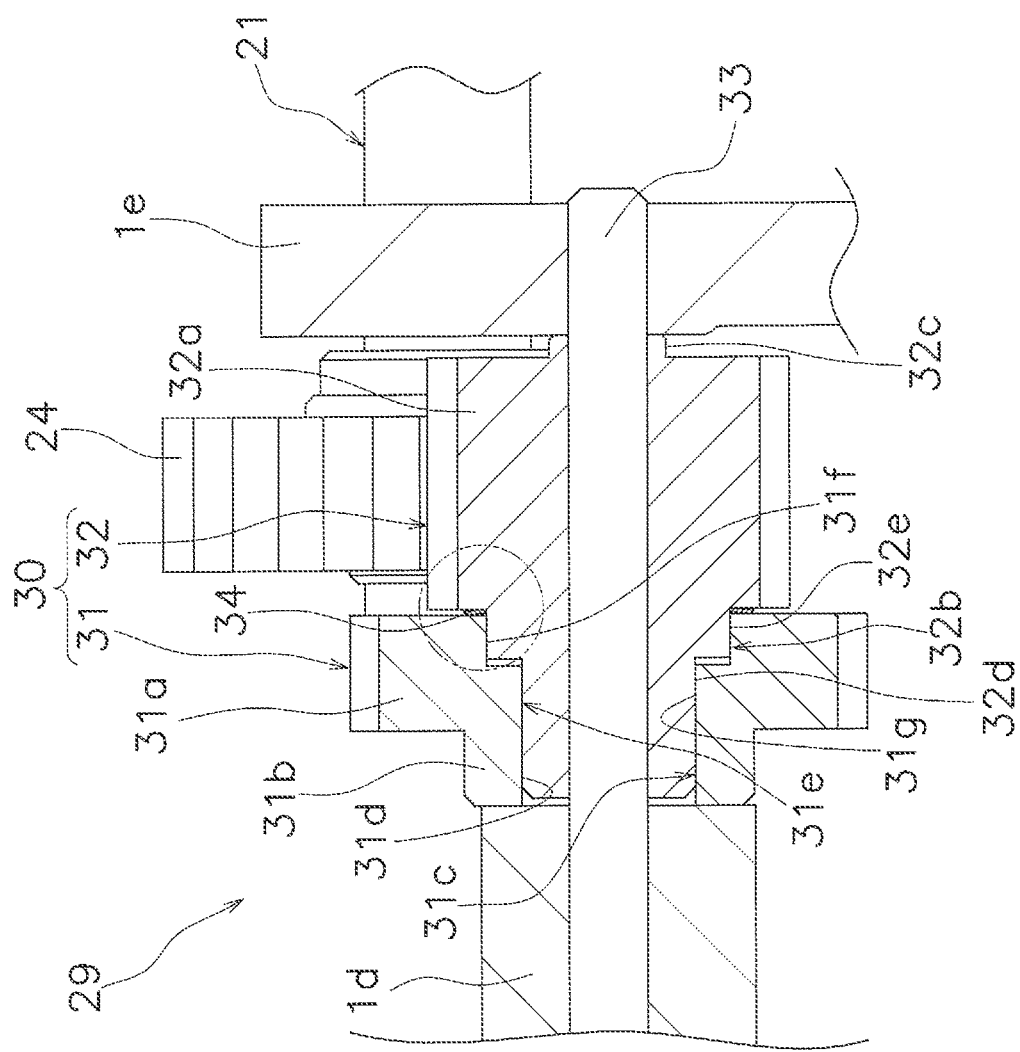
FIG. 2 is an enlarged view of a rotation transmission mechanism.

The casing 1a has a first mechanism support 1d and a second mechanism support 1e that is provided at a distance from the first mechanism support 1d in the axial direction. The first mechanism support 1d and the second mechanism support 1e are provided at the center of the casing 1a and support the pinion gear 5, the rotation transmission mechanism 29, and the like. Moreover, as shown in FIG. 2, the first mechanism support 1d and the second mechanism support 1e support a shaft 33 and at the same time restrict the rotation transmission mechanism 29 from moving in the axial direction.

The spool 3 is a cylindrical member in which the fishing line is wound on an outer periphery thereof as the handle 2 rotates, the handle 2 being rotatably coupled to the reel body 1. The spool 3 is fixed to the spool shaft 6 that is supported in the reel body 1 so as to be movable in the front-rear direction. More specifically, the spool 3 is fixed to the spool shaft 6 by a drag knob 7 that is screwed to a front end of the spool shaft 6, and the spool 3 reciprocates in the axial direction integrally with the spool shaft 6 as the handle 2 rotates.

The rotor 4 is a member for winding the fishing line on the spool 3. The rotor 4 is fixed to a front portion of the pinion gear 5 and rotates integrally with the pinion gear 5.

The pinion gear 5 is a hollow, cylindrical member, and the spool shaft 6 penetrates through the pinion gear 5. The pinion gear 5 is rotatably supported in the reel body 1 via a bearing 8a disposed in the first mechanism support 1d and a bearing 8b disposed in the second mechanism support 1e.

The rotor drive mechanism 10 is constituted by a drive shaft 11 and a drive gear 12. The drive shaft 11 is a cylindrical shaft and rotatably supported in the reel body 1 by a bearing, not shown. The drive shaft 11 is coupled to the handle 2 so as to be integrally rotatable therewith.

The drive gear 12 is coupled to the drive shaft 11 and rotates integrally with the drive shaft 11. More specifically, the drive shaft 11 and the drive gear 12 are constituted by a single member. The drive gear 12 is a face gear and meshes with the pinion gear 5. As the handle 2 rotates, the drive shaft 11 and the drive gear 12 rotate, and the pinion gear 5 meshing with the drive gear 12 rotates as well. As the pinion gear 5 rotates, the rotation of the handle 2 is transmitted to the reciprocating mechanism 20 via the rotation transmission mechanism 29.

The reciprocating mechanism 20 causes the spool 3 to reciprocate in the axial direction in response to the rotation of the handle 2. The reciprocating mechanism 20 includes a worm shaft 21, an oscillating slider 22, an oscillating guide shaft 23, and a driven gear 24.

The worm shaft 21 is supported rotatably on the reel body 1. Also, the worm shaft 21 is disposed above the drive shaft 11 so as to be parallel to the spool shaft 6. The worm shaft 21 has an outer peripheral surface on which a spiral groove 21a is formed.

The oscillating slider 22 extends in an up-down direction across the drive shaft 11 and is formed into a substantially U-shape to follow the shape of an outer peripheral portion of the drive shaft 11. The oscillating slider 22 is fixed to a rear end of the spool shaft 6. The oscillating slider 22 has an engaging pin 22a that is engaged with the spiral groove 21a of the worm shaft 21.

The oscillating guide shaft 23 guides reciprocating movement of the oscillating slider 22 in the axial direction. The oscillating guide shaft 23 is supported above the worm shaft 21 in the reel body 1 and disposed parallel to the spool shaft 6. Note that another oscillating guide shaft 23 can also be provided in the vicinity of the spool shaft 6, so that the reciprocating movement of the oscillating slider 22 in the axial direction can be guided using these two guide shafts.

The driven gear 24 is coupled to the worm shaft 21 so as to be integrally rotatable therewith. The rotation of the handle 2 is transmitted to the driven gear 24 via the rotation transmission mechanism 29. When the worm shaft 21 rotates in response to rotation of the driven gear 24, the engaging pin 22a of the oscillating slider 22 that is engaged with the spiral groove 21a of the worm shaft 21 is guided to the spiral groove 21a, whereby the spool shaft 6 reciprocates in the axial direction together with the oscillating slider 22. Note that, in the present embodiment, the driven gear 24 is a spur gear.

The rotation transmission mechanism 29 transmits the rotation of the handle 2 to the reciprocating mechanism 20. As shown in FIG. 2, the rotation transmission mechanism 29 includes an intermediate gear 30 having a first intermediate gear 31 and a second intermediate gear 32, the shaft 33, and a biasing member 34.

Figure 3:
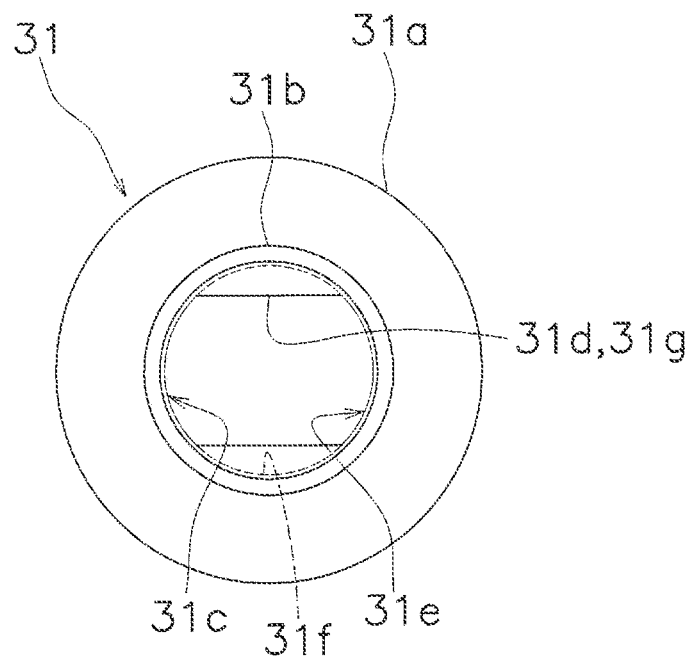
FIG. 3 is a diagram of a first intermediate gear viewed from the front.

The first intermediate gear 31 rotates in response to the rotation of the handle 2. More specifically, the first intermediate gear 31 meshes with the pinion gear 5 (see FIG. 1). FIG. 3 is a diagram of the first intermediate gear 31 viewed from the front. As shown in FIGS. 2 and 3, the first intermediate gear 31 has a first gear body 31a having gear teeth on an outer peripheral surface thereof, a first boss 31b protruding axially forward from the first gear body 31a, and a through hole 31c through which the shaft 33 penetrates the first gear body 31a and the first boss 31b in the axial direction. In the present embodiment, the first intermediate gear 31 is a helical gear. Note that the illustration of the gear teeth of the first gear body 31a is omitted in FIG. 3.

The first boss 31b has, on an inner peripheral surface thereof, a first engaged portion 31d formed in a slot shape. The first engaged portion 31d is formed using a T-slot tool, a slicing tool, or the like. A front end surface of the first boss 31b is capable of coming into contact with the first mechanism support 1d, whereby the first mechanism support 1d restricts the first intermediate gear 31 from moving axially forward.

The through hole 31c has a non-circular small-diameter hole 31e and a circular large-diameter hole 31f larger in diameter than the small-diameter hole 31e. The small-diameter hole 31e has, on an inner peripheral surface thereof, a second engaged portion 31g formed in a slot shape. The second engaged portion 31g is formed so as to be continuous with the first engaged portion 31d of the first boss 31b. A portion of the second intermediate gear 32 is housed in the small-diameter hole 31e and the large-diameter hole 31f.

The second intermediate gear 32 is coupled to the first intermediate gear 31 so as to be integrally rotatable therewith and meshes with the driven gear 24. The second intermediate gear 32 has the shaft 33 penetrating axially therethrough and is thereby rotatably supported on the shaft 33. The second intermediate gear 32 has a second gear body 32a having gear teeth on an outer peripheral surface thereof, a small-diameter portion 32b having a diameter smaller than an outer diameter of the second gear body 32a, and a second boss 32c protruding rearward from a rear end surface of the second gear body 32a. The second gear body 32a is formed to have a diameter larger than the outer diameter of the large-diameter hole 31f of the first intermediate gear 31. Note that, in the present embodiment, the second intermediate gear 32 is a spur gear and has a different tooth shape from that of the first intermediate gear 31.

The small-diameter portion 32b has an engaging portion 32d that is engaged with the first intermediate gear 31, and a support 32e that supports the first intermediate gear 31. The engaging portion 32d is formed at a front end of an outer peripheral surface of the second intermediate gear 32, and an outer periphery of the engaging portion 32d has a cross-sectional shape that is a non-circular shape. More specifically, the engaging portion 32d is located on an inner peripheral portion of the first intermediate gear 31 and formed on an outer peripheral surface of the second intermediate gear 32 facing the first engaged portion 31d and the second engaged portion 31g of the first intermediate gear 31. Such engaging portion 32d comes into engagement with the first engaged portion 31d and the second engaged portion 31g of the first intermediate gear 31, causing the second intermediate gear 32 and the first intermediate gear 31 to rotate integrally.

The support 32e of the small-diameter portion 32b is disposed between the engaging portion 32d of the small-diameter portion 32b and the second gear body 32a and contacts with an inner peripheral portion of the large-diameter hole 31f of the first intermediate gear 31 to support the first intermediate gear 31.

A front end surface of the second boss 32c is capable of coming into contact with the second mechanism support 1e, and the second intermediate gear 32 is restricted from moving axially rearward by the second mechanism support 1e.

The shaft 33 rotatably supports at least either the first intermediate gear 31 or the second intermediate gear 32. In the present embodiment, the shaft 33 rotatably supports the second intermediate gear 32. The shaft 33 penetrates the first intermediate gear 31 and the second intermediate gear 32 in the axial direction and is supported by the first mechanism support 1d and the second mechanism support 1e.

Figure 4:
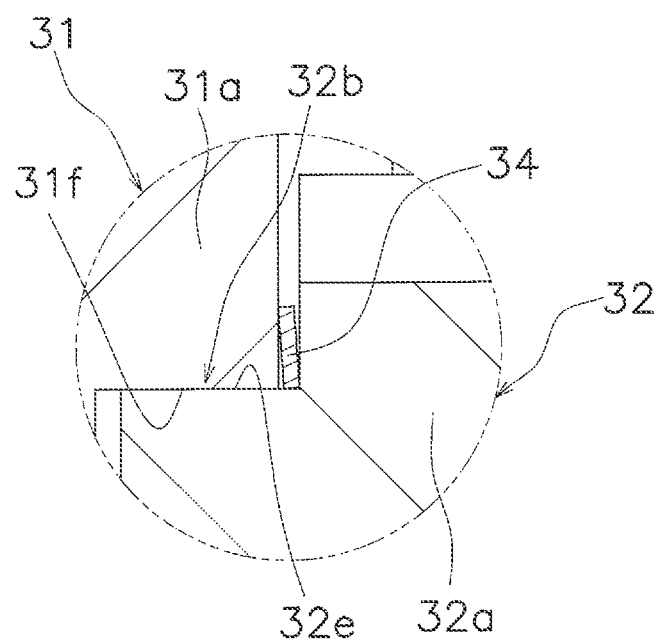
FIG. 4 is a partially enlarged view of FIG. 2.

The biasing member 34 is disposed between the first intermediate gear 31 and the second intermediate gear 32 in the axial direction and biases the first intermediate gear 31 and the second intermediate gear 32 in a direction in which the first intermediate gear 31 and the second intermediate gear 32 axially separate from each other. Thus, the biasing member 34 is an example of a means for biasing the intermediate gear 30 in an axial direction of the shaft member. The biasing member 34 is an elastically deformable, annular elastic member disposed on an outer periphery of the small-diameter portion 32b of the second intermediate gear 32. In the present embodiment, a curved washer is used as the biasing member 34. As shown enlarged in FIG. 4, the biasing member 34 is disposed in such that an outer periphery thereof is in contact with the first gear body 31a of the first intermediate gear 31 and an inner periphery of the same is in contact with the support 32e of the small-diameter portion 32b of the second intermediate gear 32 and the second gear body 32a. Note that the first mechanism support 1d restricts the first intermediate gear 31 from moving away from the second intermediate gear 32 in the axial direction, and that the second mechanism support 1e restricts the second intermediate gear 32 from moving away from the first intermediate gear 31 in the axial direction.

The rotation transmission mechanism 29 configured as described above transmits the rotation of the handle 2 to the reciprocating mechanism 20 as follows. First, when the handle 2 rotates, the rotor drive mechanism 10 rotates the pinion gear 5. When the pinion gear 5 rotates, the first intermediate gear 31 meshing with the pinion gear 5 rotates, and consequently the second intermediate gear 32 rotates integrally with the first intermediate gear 31. Subsequently, as the driven gear 24 meshing with the second intermediate gear 32 rotates, the rotation of the handle 2 is transmitted to the reciprocating mechanism 20. Note that the number of gear teeth of the first intermediate gear 31 is greater than the number of gear teeth of the pinion gear 5, and that the number of gear teeth of the second intermediate gear 32 is lower than the number of gear teeth of the driven gear 24. Therefore, the rotation of the pinion gear 5 is decelerated and transmitted to the driven gear 24.

Because the biasing member 34 is disposed between the first intermediate gear 31 and the second intermediate gear 32 in the axial direction, the first intermediate gear 31 and the second intermediate gear 32 are unlikely to wobble in the axial direction when the rotation of the handle 2 is transmitted to the reciprocating mechanism 20. Moreover, in the present embodiment, since the first intermediate gear 31 is a helical gear, an axial load acts on the first intermediate gear 31 at the time of torque transmission. This axial force acting on the first intermediate gear 31 can also be received by the biasing member 34.

Other Embodiments

Although an embodiment of the present advancement has been described above, the present disclosure is not limited thereto, and various modifications are possible without departing from the gist of the present disclosure. In particular, the plurality of embodiments described herein can be arbitrarily combined as needed.

Figure 5:
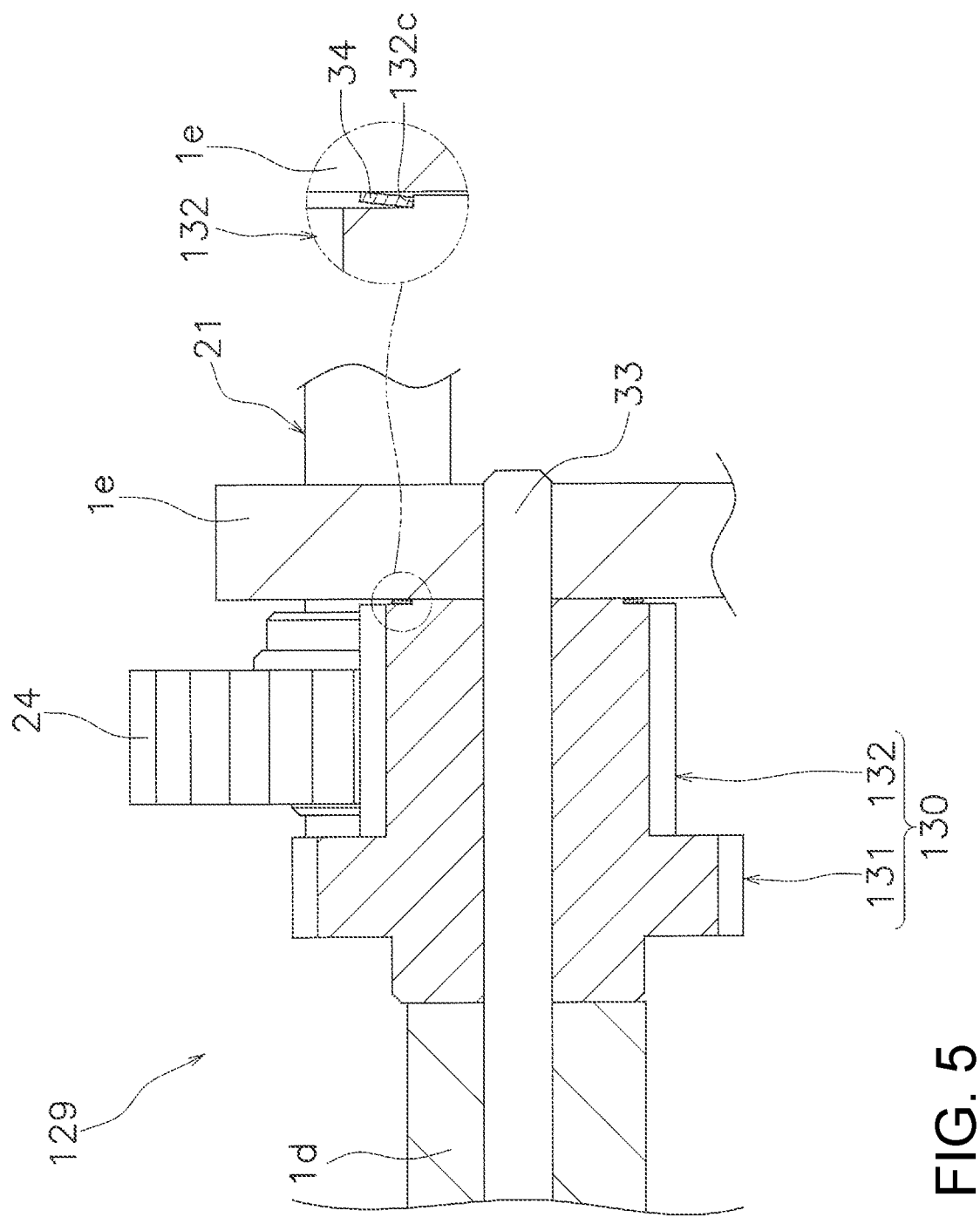
FIG. 5 is a diagram corresponding to FIG. 4 according to another embodiment.

(a) In the foregoing embodiment, the first intermediate gear 31 and the second intermediate gear 32 of the intermediate gear 30 are configured as separate members. However, as shown in FIG. 5, a first intermediate gear 131 and a second intermediate gear 132 of an intermediate gear 130 can be configured with a single member. The intermediate gear 130 is rotatably supported on the shaft 33. The biasing member 34 is disposed on an outer peripheral portion of a second boss 132c of a second intermediate gear 132 to bias the intermediate gear 130 axially forward. The first mechanism support 1d and the second mechanism support 1e restrict the intermediate gear 130 from moving in the axial direction. In this case as well, the biasing member 34 can reduce wobbling of the intermediate gear 130 in the axial direction, which makes the wobbling of the intermediate gear 130 in the axial direction unlikely to be transmitted to a rotation transmission mechanism 129. As a result, the handle shaft can be prevented from wobbling as well. Note that the position at which the biasing member 34 is disposed is not limited to the outer peripheral portion of the second boss 132c of the second intermediate gear 132 but can be any position where the intermediate gear 130 is biased in the axial direction. In addition, according to the foregoing embodiment also, the position at which the biasing member 34 is disposed can be any position where the first intermediate gear 31 and the second intermediate gear 32 are biased in the direction in which the first intermediate gear 31 and the second intermediate gear 32 axially separate from each other.

(b) In the foregoing embodiment, a curved washer is used as the biasing member 34, but an elastic member such as a coned-disc spring can also be used as the biasing member 34.

(c) In the foregoing embodiment, the second intermediate gear 32 and the driven gear 24 meshing with the second intermediate gear 32 are spur gears; however, the second intermediate gear 32 and the driven gear 24 can be configured as helical gears. Also, the shapes of the gear teeth of the first intermediate gear 31 and the second intermediate gear 32 are not limited to the ones described in the foregoing embodiment.

(d) In the foregoing embodiment, the first gear body 31a of the first intermediate gear 31 is disposed in front of the second gear body 32a of the second intermediate gear 32. However, depending on the positions at which the pinion gear 5 and the driven gear 24 are disposed, the first gear body 31a of the first intermediate gear 31 can be disposed behind the second gear body 32a of the second intermediate gear 32 so that the first intermediate gear 31 and the second intermediate gear 32 are integrally rotatably coupled to each other. In this case as well, by placing the biasing member 34 between the first intermediate gear 31 and the second intermediate gear 32 in the axial direction, wobbling of the first intermediate gear 31 and the second intermediate gear 32 can be reduced in the axial direction.

EXPLANATION OF REFERENCE NUMERALS

2 Handle
20 Reciprocating mechanism
24 Driven gear
29, 129 Rotation transmission mechanism
30, 130 Intermediate gear
31 First intermediate gear
31a First gear body
31c Through hole
32 Second intermediate gear
32a Second gear body
32b Small-diameter portion
32d Engaging portion
33 Shaft
34 Biasing member
100 Spinning reel

What is claimed is:

1. A rotation transmission mechanism of a spinning reel for fishing that transmits a rotation of a handle to a driven gear of a reciprocating mechanism, the rotation transmission mechanism comprising:
    an intermediate gear including a first intermediate gear configured to rotate in response to the rotation of the handle and a second intermediate gear configured to mesh with the driven gear, the intermediate gear configured to transmit the rotation of the handle to the driven gear;
    a shaft member that rotatably supports the intermediate gear; and
    a biasing member that biases the intermediate gear in an axial direction of the shaft member.

2. The rotation transmission mechanism according to claim 1, wherein
    the second intermediate gear is coupled to the first intermediate gear so as to be integrally rotatable therewith,
    the shaft member rotatably supports at least either the first intermediate gear or the second intermediate gear,
    the biasing member is disposed between the first intermediate gear and the second intermediate gear in the axial direction to bias the first intermediate gear and the second intermediate gear in a direction in which the first intermediate gear and the second intermediate gear axially separate from each other, and
    the first intermediate gear and the second intermediate gear are restricted from moving to separate from each other in the axial direction.

3. The rotation transmission mechanism according to claim 2, wherein
    the first intermediate gear includes a first gear body having gear teeth on an outer peripheral surface thereof, and a through hole through which the shaft member penetrates in the axial direction,
    the second intermediate gear is supported rotatably by the shaft member, and includes a second gear body that has a diameter larger than an outer diameter of the through hole of the first intermediate gear and that has gear teeth on an outer peripheral surface of the second intermediate gear, and a small-diameter portion that extends from a side surface of the second gear body toward the first intermediate gear in the axial direction and that has a diameter smaller than an outer diameter of the second gear body, and the biasing member is an elastically deformable, annular elastic member that is disposed on an outer periphery of the small-diameter portion of the second intermediate gear.

4. The rotation transmission mechanism according to claim 3, wherein
the through hole of the first intermediate gear is capable of housing a portion of the second intermediate gear, and
the small-diameter portion of the second intermediate gear partially contacts with an inner peripheral portion of the through hole to support the first intermediate gear.

5. The rotation transmission mechanism according to claim 3, wherein
the small-diameter portion of the second intermediate gear includes, on an outer periphery thereof, an engaging portion that engages with the first intermediate gear.

6. The rotation transmission mechanism according to claim 2, wherein
at least either the first intermediate gear or the second intermediate gear is a helical gear.

7. The rotation transmission mechanism according to claim 3, wherein
the gear teeth of the first intermediate gear have a shape different from that of the gear teeth of the second intermediate gear.

8. The rotation transmission mechanism according to claim 1, wherein
the biasing member is a coned-disc spring or a curved washer.

9. A spinning reel for fishing, comprising the rotation transmission mechanism described in claim 1.

10. A spinning reel for fishing, comprising:
a handle;
a reciprocating mechanism including a driven gear;
a rotation transmission mechanism that transmits rotation of the handle to the reciprocating mechanism, the rotation transmission mechanism including
an intermediate gear including a first intermediate gear configured to rotate in response to the rotation of the handle and a second intermediate gear configured to mesh with the driven gear, the intermediate gear configured to transmit the rotation of the handle to the driven gear;
a shaft member that rotatably supports the intermediate gear; and
a biasing member that biases the intermediate gear in an axial direction of the shaft member.

11. The spinning reel according to claim 10, further comprising:
a reel body including a casing, the casing including a first mechanism support and a second mechanism support provided at a distance from the first mechanism support in the axial direction,
wherein
the second intermediate gear being integrally rotatable with the first intermediate gear,
the first mechanism support restricts the first intermediate gear from moving away from the second intermediate gear in the axial direction, and the second mechanism support restricts the second intermediate gear from moving away from the first intermediate gear in the axial direction.

* * * * *